United States Patent
Shen

(10) Patent No.: US 12,010,264 B2
(45) Date of Patent: Jun. 11, 2024

(54) INFORMATION OBTAINING METHOD AND TERMINAL

(71) Applicant: VIVO MOBILE COMMUNICATION CO., LTD., Dongguan (CN)

(72) Inventor: Mingzhi Shen, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 391 days.

(21) Appl. No.: 17/378,702

(22) Filed: Jul. 17, 2021

(65) Prior Publication Data

US 2021/0344796 A1 Nov. 4, 2021

Related U.S. Application Data

(63) Continuation of application No. PCT/CN2020/071755, filed on Jan. 13, 2020.

(30) Foreign Application Priority Data

Jan. 17, 2019 (CN) .......................... 201910044261.6

(51) Int. Cl.
*H04M 3/42* (2006.01)
*H04L 51/52* (2022.01)
(Continued)

(52) U.S. Cl.
CPC ........ *H04M 3/42068* (2013.01); *H04L 51/52* (2022.05); *H04M 1/7243* (2021.01); *H04M 1/72448* (2021.01)

(58) Field of Classification Search
CPC .......................... H04M 3/42068; H04M 1/7243
See application file for complete search history.

(56) References Cited

U.S. PATENT DOCUMENTS

| 2005/0055450 A1* | 3/2005 | Gang | .................. G06F 16/9535 |
| | | | 709/228 |
| 2013/0066992 A1* | 3/2013 | Ben-Yoseph | .......... H04L 67/54 |
| | | | 709/206 |

(Continued)

FOREIGN PATENT DOCUMENTS

| CN | 1459182 A | 11/2003 |
| CN | 104363356 A | 2/2015 |

(Continued)

OTHER PUBLICATIONS

International Search Report issued in corresponding International Application No. PCT/CN2020/071755, mailed April 2. 2020, 4 pages.

(Continued)

*Primary Examiner* — Amal S Zenati
(74) *Attorney, Agent, or Firm* — IPX PLLC

(57) ABSTRACT

Embodiments of the present disclosure provide an information obtaining method and a terminal. The method includes: obtaining user profile information of a first user and user profile information of at least one second user; determining first information based on the user profile information of the first user and the user profile information of the second user, where the first information includes at least one of the following: personal information of the second user, or same feature information of the first user and the second user; and displaying the first information on a first screen of the terminal.

15 Claims, 6 Drawing Sheets

(51) Int. Cl.
*H04M 1/7243* (2021.01)
*H04M 1/72448* (2021.01)

(56) References Cited

U.S. PATENT DOCUMENTS

| | | |
|---|---|---|
| 2014/0369240 A1 | 12/2014 | Toner et al. |
| 2015/0373183 A1* | 12/2015 | Woolsey ........... H04M 1/72448 |
| | | 455/418 |
| 2016/0335532 A1* | 11/2016 | Sanghavi ................ H04L 51/02 |

FOREIGN PATENT DOCUMENTS

| | | |
|---|---|---|
| CN | 104615655 A | 5/2015 |
| CN | 105471699 A | 4/2016 |
| CN | 105550231 A | 5/2016 |
| CN | 107453980 A | 12/2017 |
| CN | 108462794 A | 8/2018 |
| CN | 109547648 A | 3/2019 |
| EP | 2187334 A1 | 5/2010 |

OTHER PUBLICATIONS

First Office Action issued in related Chinese Application No. 201910044261.6, mailed Apr. 2, 2020, 7 pages.

* cited by examiner

INFORMATION OBTAINING METHOD AND TERMINAL

CROSS-REFERENCE TO RELATED APPLICATIONS

This application is a bypass continuation of PCT Application No. PCT/CN2020/071755 filed Jan. 13, 2020, which claims priority to Chinese Patent Application No. 201910044261.6 filed in China on Jan. 17, 2019, both of which are incorporated herein by reference in their entireties.

TECHNICAL FIELD

Embodiments of the present disclosure relate to the field of communications technologies, and in particular, to an information obtaining method and a terminal.

BACKGROUND

Current chat software is only for single-screen operation. A mobile phone screen can display only a chat dialog, and is not smart enough. When related information of a particular buddy is needed, a profile of the buddy further needs to be manually viewed. Sometimes because an appropriate topic cannot be found, the scenario becomes very embarrassing, there is nothing to say, and the chat is hurriedly ended.

SUMMARY

Embodiments of the present disclosure provide an information obtaining method and a terminal, to solve a problem in the related art of difficulty in obtaining information associated with a buddy when a user uses a terminal to chat.

To solve the foregoing problem, the following solutions are used in the present disclosure.

According to a first aspect, an information obtaining method is provided, applied to a terminal having at least two screens. The method includes:
  obtaining user profile information of a first user and user profile information of at least one second user, where the first user is a user of the terminal, and the second user is a peer user in a communication process;
  determining first information based on the user profile information of the first user and the user profile information of the second user, where the first information includes at least one of the following: personal information of the second user, and same feature information of the first user and the second user; and displaying the first information on a first screen of the terminal.

According to a second aspect, a terminal is provided. The terminal has at least two screens, and the terminal further includes:
  an obtaining module, configured to obtain user profile information of a first user and user profile information of at least one second user, where the first user is a user of the terminal, and the second user is a peer user in a communication process;
  a determining module, configured to determine first information based on the user profile information of the first user and the user profile information of the second user obtained by the obtaining module, where the first information includes at least one of the following: personal information of the first user, and same feature information of the first user and the second user; and a first display module, configured to display, on a first screen of the terminal, the first information determined by the determining module.

According to a third aspect, a terminal is provided, including a processor, a memory, and a computer program that is stored in the memory and that can be run on the processor, and when the computer program is executed by the processor, steps of the information obtaining method described above are implemented.

According to a fourth aspect, a computer-readable storage medium is provided. A computer program is stored in the computer-readable storage medium, and when the computer program is executed by a processor, steps of the information obtaining method described above are implemented.

In the embodiments of the present disclosure, information related to the peer user and a local user is determined based on the user profile information of the local user and the user profile information of the peer user, and the information is displayed by displaying a screen outside a communication interface. In this way, the local user can determine, based on the information, content for communication with the peer user, while communicating with the peer user. The user can quickly find a chat topic, especially when the local user is chatting with the peer user, thereby making a chat process smoother and more pleasant.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts

DESCRIPTION OF EMBODIMENTS

Example embodiments of the present disclosure are described below in more detail with reference to the accompanying drawings. Although the accompanying drawings show example embodiments of the present disclosure, it should be understood that the present disclosure can be implemented in various forms and shall not be limited by the embodiments described herein. Instead, these embodiments are provided in order to provide a more thorough understanding of the present disclosure and to be able to convey the scope of the present disclosure to a person skilled in the art.

According to one aspect of embodiments of the present disclosure, an information obtaining method is provided, applied to a terminal. The terminal includes at least a first screen 201 and a second screen 202. The first screen 201 and the second screen 202 may be screens on a same side of the terminal. For example, the first screen 201 and the second screen 202 are both screens on the front of the terminal. They may alternatively be screens on different sides of the terminal. For example, the first screen 201 is a screen on the front of the terminal, and the second screen 202 is a screen on the back of the terminal.

Figure 1:
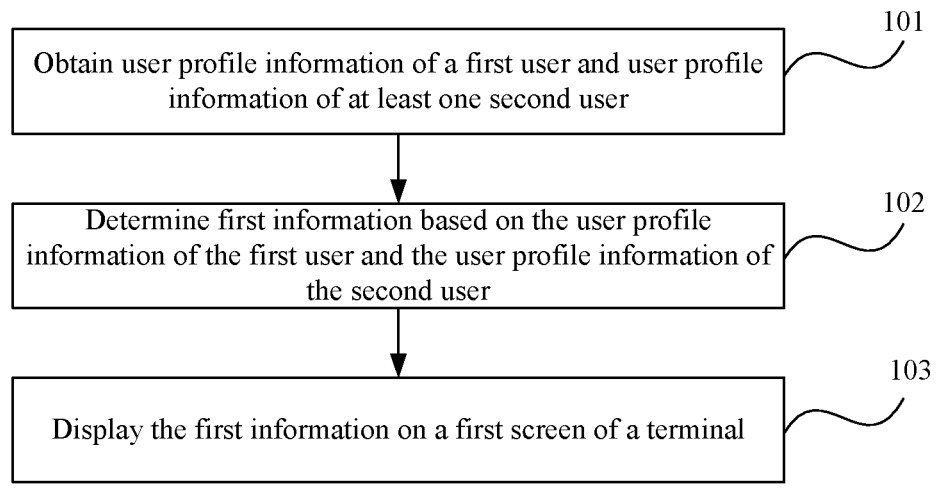
FIG. 1 is a flowchart of an information obtaining method according to an embodiment of the present disclosure.

As shown in FIG. 1, the information obtaining method includes the following steps.

Step 101: Obtain user profile information of a first user and user profile information of at least one second user.

The first user herein is a local user in a communication process, that is, a user corresponding to the terminal, briefly referred to as a terminal user. The second user herein is a peer user in the communication process, and there is at least one peer user. For example, in the case of a group chat, the local user can select one or more target peer users from peer users in the group chat.

The user profile information herein may be information related to a user and intelligently collected by the terminal during a process of using the terminal (for example, a mobile phone) by the user. For example, through the positioning function of the terminal, a place that the user has visited at a particular time or a place that the user has frequently visited within a period of time is recorded by using a positioning function of the terminal; frequently used software, infrequently used software, and the like are obtained through analysis by recording frequency and time of use of application software in the terminal by the user.

The user profile information of the first user is all profile information or partial profile information of the first user, and the user profile information of the second user is all profile information or partial profile information of the second user. In this embodiment of the present disclosure, the user can set its user profile information permission, that is, allowing or prohibiting others to obtain the user profile information can be set. When obtaining the user profile information by others is allowed, which person is allowed to obtain the user profile information and which user profile information is allowed to be obtained by others can be further set.

Step 102: Determine first information based on the user profile information of the first user and the user profile information of the second user.

The first information herein includes at least one of the following: personal information of the second user (such as age, gender, name, occupation, and current location), and same feature information of the first user and the second user (such as same hobby and interest information, information about a same place that have been visited within a preset time (a dining place, a work place, a travel place, a shopping place, and the like), and application software used in common).

In this embodiment of the present disclosure, some basic attribute information of the second user and information related to the first user are obtained based on the user profile information of the first user and the user profile information of the second user.

Step 103: Display the first information on a first screen of the terminal.

In this step, after the first information is determined by using step 102, the first information is displayed on the first screen of the terminal, and a communication interface of the local user and the peer user is displayed on the second screen of the terminal. In this way, the local user can determine, based on the first information displayed on the first screen, content of communication with the peer user, while communicating with the peer user. The user can quickly find a chat topic, especially when the local user is chatting with the peer user, thereby making a chat process smoother and more pleasant.

Forms of the communication herein include but are not limited to: text communication, voice communication, video communication, and the like.

Specifically, in this embodiment of the present disclosure, the displaying the first information on a first screen of the terminal in step 103 includes: displaying the first information on the first screen of the terminal in a text form and/or a graphic form.

Figure 2:
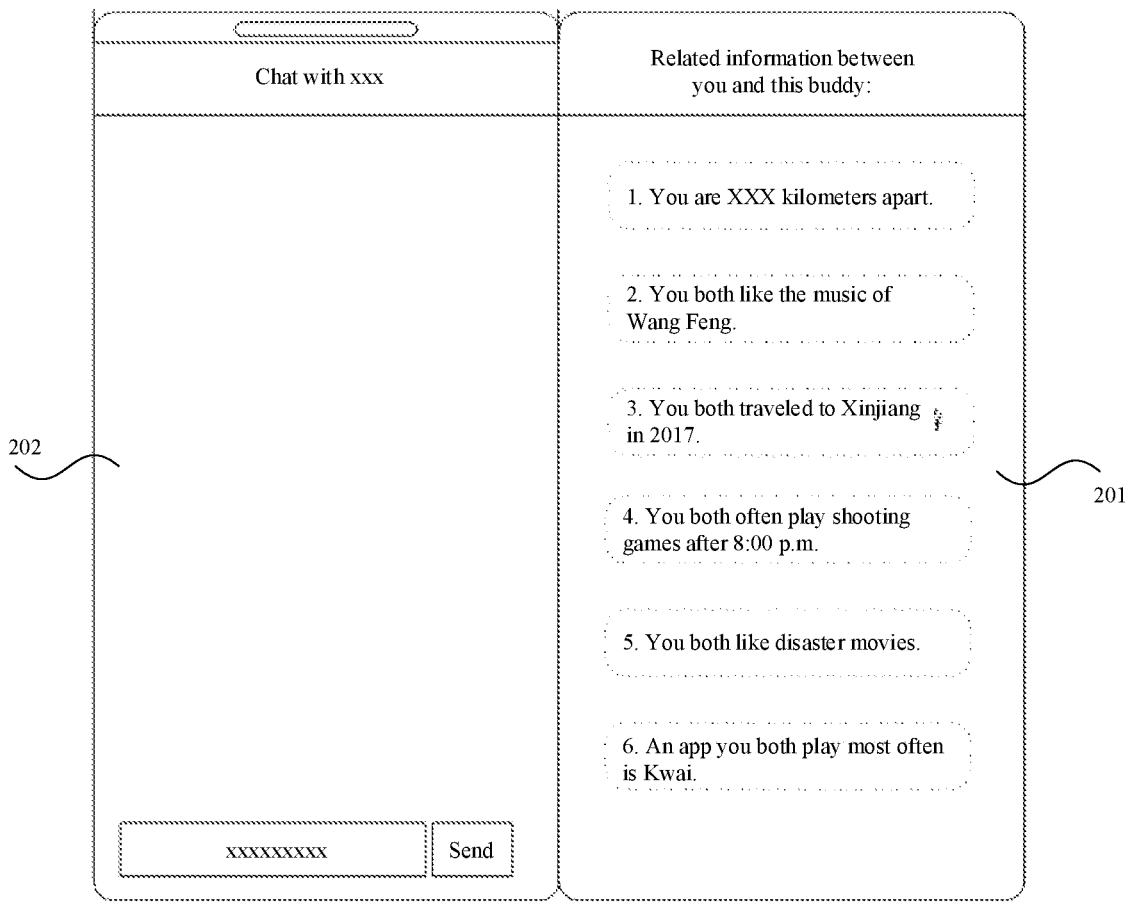
FIG. 2 is a first schematic diagram of display of first information according to an embodiment of the present disclosure.
Figure 3:
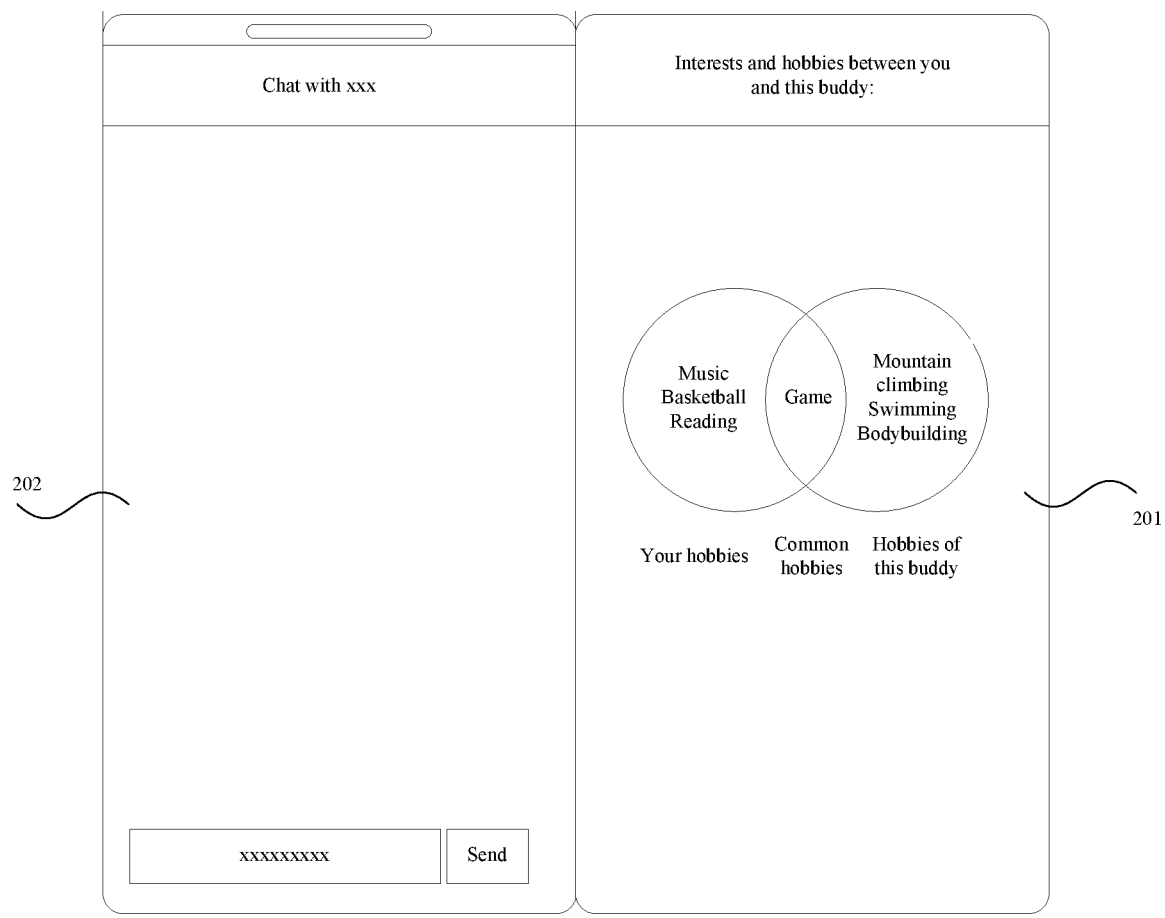
FIG. 3 is a second schematic diagram of display of first information according to an embodiment of the present disclosure.

In this embodiment of the present disclosure, the first information may be displayed in the text form on the first screen, as shown in FIG. 2, or may be displayed in the graphic form on the first screen, as shown in FIG. 3. Certainly, it can be understood that, the first information may also be displayed in a form of a combination of text and graphics on the first screen. Specific cases may be designed according to actual needs.

To further understand the solutions provided in this embodiment of the present disclosure, the following is described with an example.

Figure 4:
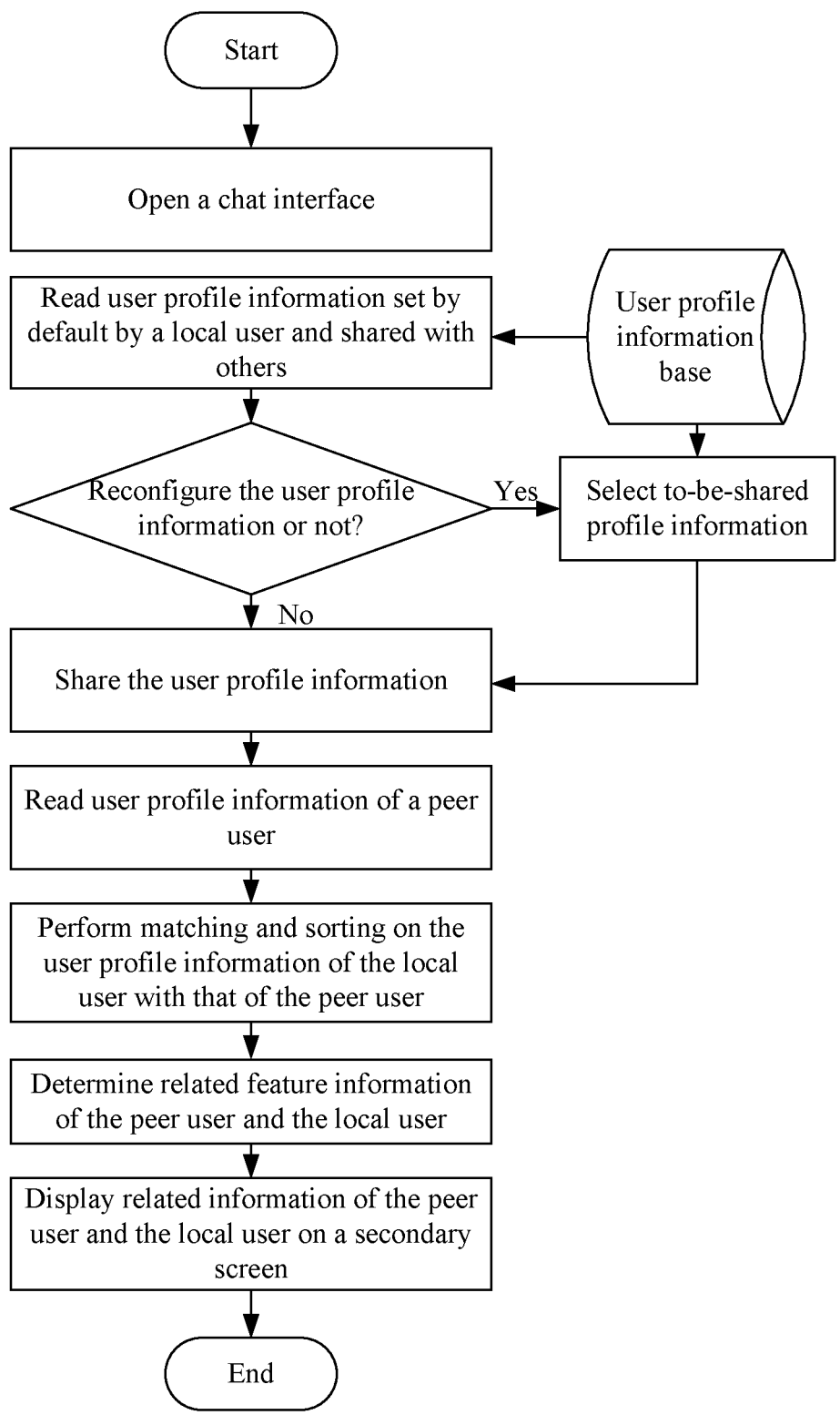
FIG. 4 is a flowchart of an example according to an embodiment of the present disclosure.

As shown in FIG. 4, the local user opens a chat interface, where the chat interface is displayed on a main screen of the terminal. The chat interface can be a single chat or a group chat. After the chat interface is opened, the terminal reads, from a user profile information base of the terminal, user profile information set by default by the local user and sharable with others. During a chat, for different chat objects, the local user can reconfigure user profile information for a particular chat group according to a requirement, for example, disable or enable a sharing function of the user profile information, and after enabling the sharing function of user profile information, set which user profile information is used for sharing. After the setting, user profile information that the local user allows to be shared can be automatically synchronized to a sharing end, so that others have permission to read the information. Then, the terminal reads user profile information of the peer user, performs matching and sorting with the read user profile information of the local user, to find feature information associated with the profile information of the peer user and the profile information of the local user, and displays the associated feature information on a secondary screen of the terminal. In addition to setting the permission of the user profile information, the local user may further set a display manner of the first information, for example, whether the first information is displayed in text or graphics.

Further, after the displaying the first information on a first screen of the terminal in step 103, the method further includes: when content of communication between the first user and the second user includes field information in the first information, conspicuously displaying the field information.

Figure 5:
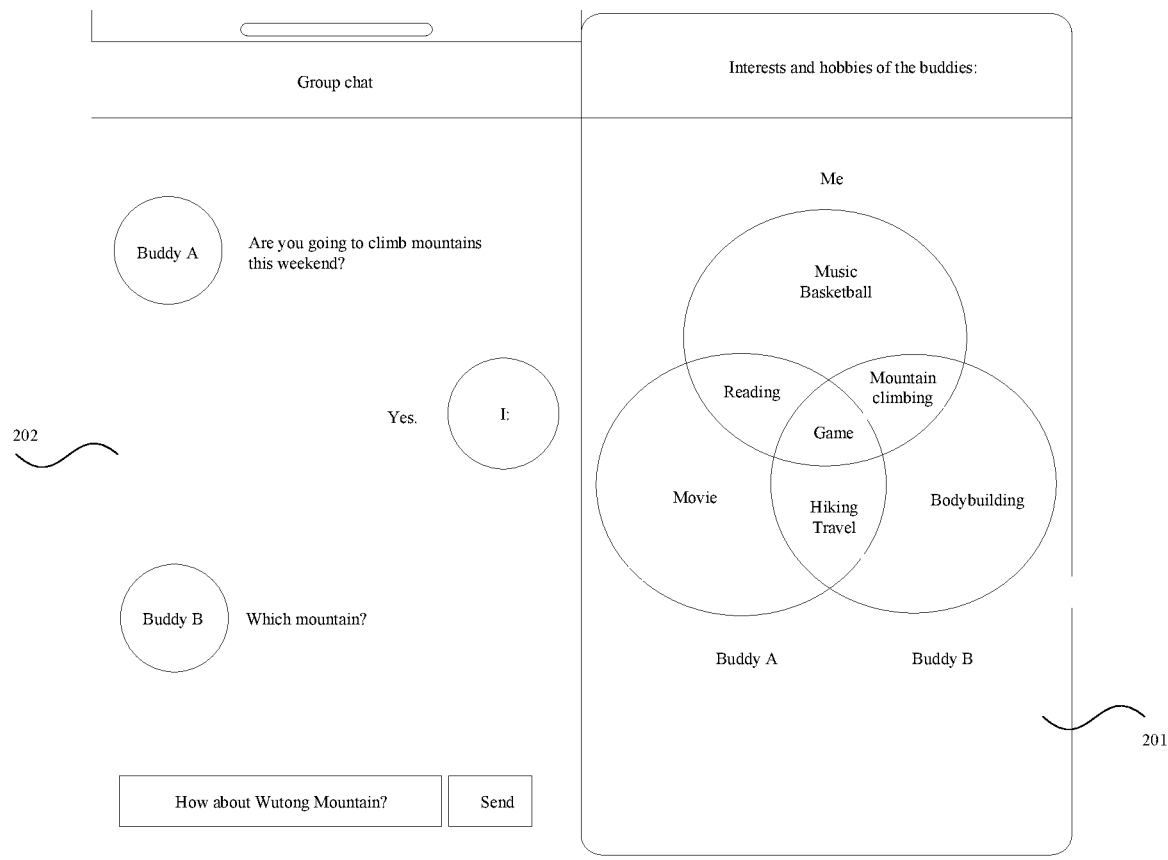
FIG. 5 is a third schematic diagram of display of first information according to an embodiment of the present disclosure.

In this embodiment of the present disclosure, as shown in FIG. 5, when the field information in the first information appears in the content of the communication between the local user and the peer user, the field information, such as field information "mountain climbing" in FIG. 5, is conspicuously displayed. Manners of the conspicuously displaying include but are not limited to: highlighting the field information, bolding the field information, magnifying the field information for display, and the like. For determining of the field information, if the local user and the peer user communicate with each other in a text form, the determining can be made by recognizing text information in the communication content. If the local user and the peer user communicate with each other in a voice or video form, the determining can be made by recognizing voice information in the communication content.

After the foregoing field information is conspicuously displayed, the method further includes: receiving a first input by the first user to the field information; and displaying second information on the first screen in response to the first input, where the second information is information that is associated with the field information and that is in the user profile information of the second user.

The information that is associated with the field information and that is in the user profile information of the second user may be: information that is determined from the profile information of the second user by using all or a part of the field information as a keyword.

In this embodiment of the present disclosure, after field information in the first information is conspicuously displayed, the local user can tap the conspicuously displayed field information. After receiving a touch operation of the local user on the conspicuously displayed field information, the terminal displays, on the first screen, the information (namely, the second information) that is associated with the conspicuously displayed field information and that is in the user profile information of the peer user. For example, the conspicuously displayed field information is "mountain climbing". When the local user taps the "mountain climbing" field, the terminal searches the user profile information of the peer user for information related to "mountain climbing", for example, information such as frequency, a location, and time of mountain climbing by the peer user, so that local user can better grasp chat content.

Further, in this embodiment of the present disclosure, at least one piece of communication information sent by the second user is displayed in the communication interface of the first user and the second user, and the communication information includes but is not limited to: text information and voice information.

The method further includes: receiving a second input by the first user to the piece of communication information sent by the second user; and displaying third information on the first screen in response to the second input.

The third information is information associated with content of the communication information, and the information associated with the content of the communication information may be information obtained through searching by using all or a part of the communication information as a keyword.

In this embodiment of the present disclosure, after receiving a touch operation of the local user on the piece of communication information sent by the peer user, the terminal can search for information associated with the communication information, and display, on the first screen, the found information (namely, the third information) associated with the content of the communication information, so that the local user views the displayed information.

Figure 6:
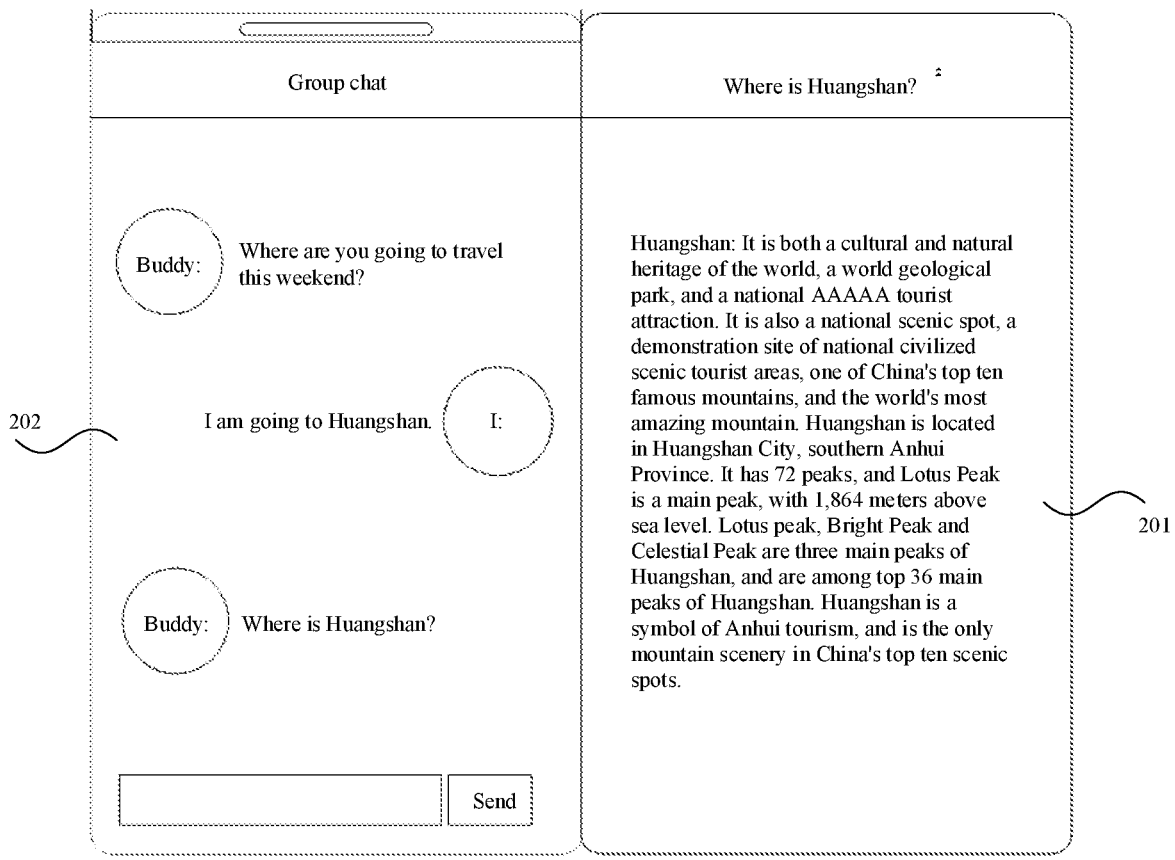
FIG. 6 is a schematic diagram of display of third information according to an embodiment of present disclosure.

For example, when the local user and the peer user are chatting by using terminals, the peer user sends a message to the local user, and the message includes information "Where is Huangshan". After the local user taps the piece of communication information, the terminal performs a smart search. After the search is completed, a search result is displayed on the first screen, as shown in FIG. 6.

Further, before the obtaining user profile information of a first user and user profile information of at least one second user in step 101, the method further includes:

detecting whether a matching function used to automatically obtain the user profile information of the first user and the user profile information of the at least one second user and determine the first information is enabled; and when the matching function is enabled, performing the step of obtaining user profile information of a first user and user profile information of at least one second user.

In this embodiment of the present disclosure, a matching function can be set; and the user profile information of the first user and the user profile information of the at least one second user can be obtained and the first information can be determined based on the obtained user profile information, only when the matching function is enabled.

In this embodiment of the present disclosure, the smart matching function can be manually enabled by a user, which is specifically as follows: A third input by the user to a control button used to control enabling/disabling of the matching function is received, and the matching function is enabled in response to the third input. Alternatively, the matching function can be automatically enabled when it is detected that the communication interface appears.

In conclusion, in this embodiment of the present disclosure, information related to the peer user and the local user is determined based on the user profile information of the local user and the user profile information of the peer user, and the information is displayed by displaying a screen outside the communication interface. In this way, the local user can determine, based on the information, content for communication with the peer user, while communicating with the peer user. The user can quickly find a chat topic, especially when the local user is chatting with the peer user, thereby making a chat process smoother and more pleasant.

According to another aspect of embodiments of the present disclosure, a terminal is provided. The terminal has at least two screens, and can implement details in the foregoing information obtaining method and achieve a same effect.

Figure 7:
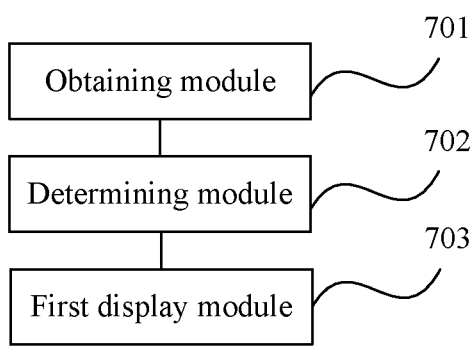
FIG. 7 is a first block diagram of a terminal according to an embodiment of the present disclosure.

As shown in FIG. 7, the terminal includes: an obtaining module 701, a determining module 702, and a first display module 703.

The obtaining module 701 is configured to obtain user profile information of a first user and user profile information of at least one second user.

The first user is a local user in a communication process, that is, a user corresponding to the terminal, briefly referred to as a terminal user. The second user is a peer user in the communication process.

The determining module 702 is configured to determine first information based on the user profile information of the first user and the user profile information of the second user obtained by the obtaining module 701.

The first information includes at least one of the following: personal information of the second user, and same feature information of the first user and the second user.

The first display module 703 is configured to display, on a first screen of the terminal, the first information determined by the determining module 702.

A communication interface of the first user and the second user is displayed on a second screen of the terminal.

Specifically, the same feature information includes at least same interest and hobby information.

Specifically, the first display module 703 includes:

a display unit, configured to display the first information on the first screen of the terminal in a text form and/or a graphic form.

Specifically, the terminal further includes:
a second display module, configured to: after the first information displayed on the first screen of the terminal, if content of communication between the first user and the second user includes field information in the first information, conspicuously display the field information.

Specifically, the terminal further includes:
a first receiving module, configured to: after the field information is conspicuously displayed, receive a first input by the first user to the field information; and
a third display module, configured to display second information on the first screen in response to the first input received by the first receiving module.

The second information is information that is associated with the field information and that is in the user profile information of the second user.

Specifically, at least one piece of communication information sent by the second user is displayed in the communication interface of the first user and the second user displays.

The terminal further includes:
a second receiving module, configured to receive a second input by the first user to the piece of communication information sent by the second user; and
a fourth display module, configured to display third information on the first screen in response to the second input received by the second receiving module.

The third information is information associated with content of the communication information.

In this embodiment of the present disclosure, information related to the peer user and the local user is determined based on the user profile information of the local user and the user profile information of the peer user, and the information is displayed by displaying a screen outside the communication interface. In this way, the local user can determine, based on the information, content for communication with the peer user, while communicating with the peer user. The user can quickly find a chat topic, especially when the local user is chatting with the peer user, thereby making a chat process smoother and more pleasant.

Figure 8:
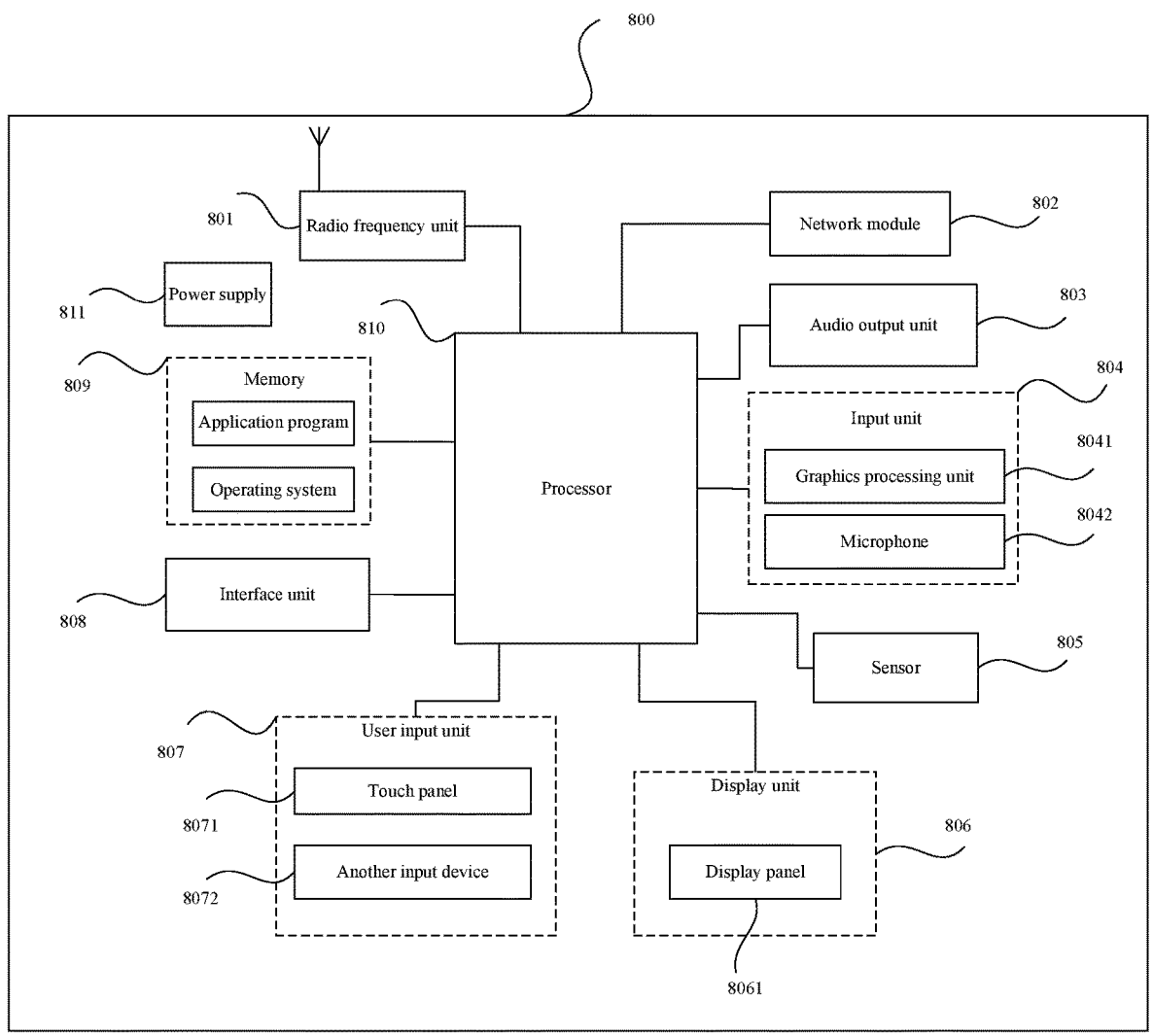
FIG. 8 is a second block diagram of a terminal according to an embodiment of the present disclosure.

FIG. 8 is a schematic diagram of a hardware structure of a terminal for implementing embodiments of the present disclosure.

The terminal 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that a structure of the terminal shown in FIG. 8 does not constitute a limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, an in-vehicle terminal, a wearable device, a pedometer, and the like.

The processor 810 is configured to obtain user profile information of a first user and user profile information of at least one second user; determine first information based on the user profile information of the first user and the user profile information of the second user; and display the first information on a first screen of the terminal.

The first user is a user of the terminal, and the second user is a peer user in a communication process. The first information includes at least one of the following: personal information of the second user, and same feature information of the first user and the second user. A communication interface of the first user and the second user is displayed on a second screen of the terminal.

In this embodiment of the present disclosure, information related to the peer user and the local user is determined based on the user profile information of the local user and the user profile information of the peer user, and the information is displayed by displaying a screen outside the communication interface. In this way, the local user can determine, based on the information, content for communication with the peer user, while communicating with the peer user. The user can quickly find a chat topic, especially when the local user is chatting with the peer user, thereby making a chat process smoother and more pleasant.

It should be understood that in this embodiment of the present disclosure, the radio frequency unit 801 may be configured to receive and transmit information, or receive and transmit a signal during a call. Specifically, the radio frequency unit 801 receives downlink data from a base station, and then transmits the downlink data to the processor 810 for processing; and in addition, transmits uplink data to the base station. Usually, the radio frequency unit 801 includes but not limited to: an antenna, at least one amplifier, a transceiver, a coupler, a low noise amplifier, a duplexer, and the like. In addition, the radio frequency unit 801 may communicate with a network and another device through a wireless communications system.

The terminal provides a user with wireless broadband internet access by using the network module 802, for example, helping the user receive and send an email, browse a web page, and access streaming media.

The audio output unit 803 may convert audio data received by the radio frequency unit 801 or the network module 802 or stored in the memory 809 into an audio signal and output the audio signal as a sound. In addition, the audio output unit 803 may further provide an audio output (for example, a call signal received sound, or a message received sound) related to a specific function implemented by the terminal 800. The audio output unit 803 includes a loudspeaker, a buzzer, a receiver, and the like.

The input unit 804 is configured to receive audio or video signals. The input unit 804 may include a Graphics Processing Unit (GPU) 8041 and a microphone 8042. The graphics processing unit 8041 processes image data of a static picture or a video obtained by an image capture apparatus (for example, a camera) in a video capture mode or image capture mode. A processed image frame may be displayed on the display unit 806. An image frame processed by the graphics processing unit 8041 may be stored in the memory 809 (or another storage medium) or sent via the radio frequency unit 801 or the network module 802. The microphone 8042 may receive a sound and can process such a sound into audio data. Processed audio data may be converted, in a telephone call mode, into a format that can be sent to a mobile communication base station via the radio frequency unit 801 for output.

The terminal 800 further includes at least one sensor 805, for example, a light sensor, a motion sensor, and another sensor. Specifically, the light sensor includes an ambient light sensor and a proximity sensor. The ambient light sensor may adjust luminance of a display panel 8061 based on brightness of ambient light, and the proximity sensor may turn off the display panel 8061 and/or backlight when the terminal 800 approaches an ear. As a type of motion sensor, an accelerometer sensor may detect values of accelerations in various directions (generally three axes), and may detect a value and a direction of gravity when the terminal stays still. The accelerometer sensor may be configured to recognize a terminal posture (for example, landscape/portrait screen switching, a related game, or magnetometer posture calibration), performs a vibration recognition related function (for example, a pedometer or a strike), and so on. The sensor 805 may further include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information entered by the user or information provided for the user. The display unit 806 may include the display panel 8061, and the display panel 8061 may be configured in a form of a Liquid Crystal Display (LCD), an Organic Light-Emitting Diode (OLED), or the like.

The user input unit 807 may be configured to receive input digit or character information and generate key signal input related to a user setting and function control of the terminal. Specifically, the user input unit 807 includes a touch panel 8071 and another input device 8072. The touch panel 8071, also referred to as a touchscreen, can collect a touch operation (such as an operation on or near the touch panel 8071 performed by a user by using any suitable object or accessory such as a finger or a stylus) performed by a user on or near the touch panel 8071. The touch panel 8071 may include two parts: a touch detection apparatus and a touch controller. The touch detection apparatus detects a touch direction and position of the user, detects a signal brought by the touch operation, and transmits the signal to the touch controller. The touch controller receives touch information from the touch detection apparatus, converts the touch information into touch point coordinates, and sends the touch point coordinates to the processor 810; and receives and executes a command sent by the processor 810. In addition, the touch panel 8071 may be implemented as a resistive type, a capacitive type, an infrared type, a surface acoustic wave type, or the like. The user input unit 807 may further include the another input device 8072 in addition to the touch panel 8071. Specifically, the another input device 8072 may include but is not limited to a physical keyboard, a function button (such as a volume control button or a power on/off button), a trackball, a mouse, a joystick, and the like. Details are not described herein.

Further, the touch panel 8071 can cover the display panel 8061. When detecting a touch operation on or near the touch panel 8071, the touch panel 8071 transmits the touch operation to the processor 810 to determine a type of a touch event. Then, the processor 810 provides corresponding visual output on the display panel 8061 based on the type of the touch event. Although the touch panel 8071 and the display panel 8061 are used as two separate components to implement input and output functions of the terminal in FIG. 8, in some embodiments, the touch panel 8071 and the display panel 8061 may be integrated to implement the input and output functions of the terminal. This is not specifically limited herein.

The interface unit 808 is an interface connecting an external apparatus and the terminal 800. For example, the external apparatus may include a wired or wireless headset jack, an external power supply (or a battery charger) port, a wired or wireless data port, a storage card port, a port for connecting an apparatus having a recognition module, an audio input/output (input/output, I/O) port, a video I/O port, an earphone jack, or the like. The interface unit 808 may be configured to receive an input (such as data information or electric power) from the external apparatus and transmit the received input to one or more elements of the terminal 800, or may be configured to transmit data between the terminal 800 and the external apparatus.

The memory 809 may be configured to store a software program as well as various types of data. The memory 809 may mainly include a program storage area and a data storage area. The program storage area may store an operating system, an application program (for example, a sound play function or an image play function) required for at least one function, and the like. The data storage area may store data created based on use of the mobile phone (for example, audio data and a phone book), and the like. In addition, the memory 809 may include a high-speed random access memory, and may further include a non-volatile memory such as at least one magnetic disk storage device, a flash memory device, or another volatile solid-state storage device.

The processor 810 is a control center of the terminal, and is connected to all parts of the entire terminal by using various interfaces and lines, and performs various functions of the terminal and processes data by running or executing the software program and/or a module that are stored in the memory 809 and invoking the data stored in the memory 809, to implement overall monitoring on the terminal. The processor 810 may include one or more processing units. Optionally, the processor 810 may integrate an application processor and a modem processor. The application processor mainly processes an operating system, a user interface, and an application program. The modem processor mainly processes wireless communication. It can be understood that alternatively, the modem processor may not be integrated into the processor 810.

The terminal 800 may further include a power supply 811 (for example, a battery) that supplies power to each component. Optionally, the power supply 811 may be logically connected to the processor 810 by using a power management system, to implement functions such as charging, discharging, and power consumption management by using the power management system.

In addition, the terminal 800 includes some function modules not shown, and details are not described herein.

Optionally, an embodiment of the present disclosure further provides a terminal, including a processor 810, a memory 809, a computer program stored in the memory 809 and executable on the processor 810. When the computer program is executed by the processor 810, processes of the foregoing information obtaining method embodiment are implemented, and a same technical effect can be achieved. To avoid repetition, details are not described herein again.

An embodiment of the present disclosure further provides a computer-readable storage medium. The computer-readable storage medium stores a computer program. When the computer program is executed by a processor, processes of the foregoing information obtaining method embodiment are implemented, and a same technical effect can be achieved. To avoid repetition, details are not described herein again. The computer-readable storage medium is, for example, a Read-Only Memory (ROM), a Random Access Memory (RAM), a magnetic disk, an optical disc, or the like.

It should be noted that in this specification, the terms "comprise", "include", and any other variants thereof are intended to cover non-exclusive inclusion, so that a process, a method, an article, or an apparatus that includes a series of elements not only includes these elements, but also includes other elements not expressly listed, or further includes elements inherent to this process, method, article, or apparatus. An element limited by "includes a . . . ", without more constraints, does not preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is an exemplary implementation. Based on such an understanding, the technical solutions of the present disclosure essentially or the part contributing to the related art may be implemented in a form of a software product. The computer software product is stored in a storage medium (such as a ROM/RAM, a magnetic disk, or an optical disc), and includes several instructions for enabling a terminal (which may be a mobile phone, a computer, a server, an air conditioner, a network device, or the like) to perform the methods described in the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for purposes of convenient and brief description, for a detailed operating process of the foregoing system, apparatus, and unit, reference may be made to a corresponding process in the foregoing method embodiments. Details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one location, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of the present disclosure essentially, or the part contributing to the related art, or some of the technical solutions may be implemented in a form of a software product. The computer software product is stored in a storage medium, and includes several instructions for enabling a computer device (which may be a personal computer, a server, a network device, or the like) to perform all or some of the steps of the methods described in the embodiments of the present disclosure. The storage medium includes various media that can store program code, such as a USB flash disk, a removable hard disk, a ROM, a RAM, a magnetic disk, or an optical disc.

A person of ordinary skill in the art can understand that all or some of the procedures in the methods of the foregoing embodiments may be implemented by a computer program controlling related hardware. The program may be stored in a computer-readable storage medium. When the program is executed, the procedures of the embodiments of the foregoing methods may be performed. The storage medium may be a magnetic disk, an optical disc, a ROM, a RAM, or the like.

It may be understood that the embodiments described in the embodiments of the present disclosure may be implemented by hardware, software, firmware, middleware, microcode, or a combination thereof. For hardware implementation, a processing unit can be implemented in one or more Application Specific Integrated Circuits (ASIC), a Digital Signal Processor (DSP), a DSP Device (DSPD), a Programmable Logic Device (PLD), a Field-Programmable Gate Array (FPGA), a general-purpose processor, a controller, a microcontroller, a microprocessor, other electronic units used to perform the functions described in this disclosure, or a combination thereof.

For software implementation, the technology in the embodiments of the present disclosure may be implemented through modules (for example, procedures or functions) that perform the functions in the embodiments of the present disclosure. Software code may be stored in a memory and executed by a processor. The memory may be implemented in the processor or outside the processor.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skill in the art may make many forms without departing from the aims of the present disclosure and the protection scope of claims, all of which fall within the protection of the present disclosure.

The invention claimed is:

1. An information obtaining method, performed by a terminal having at least two screens comprising a first screen and a second screen, comprising:
while a first user is in active communication with a second user through a communication interface displayed on the second screen, obtaining user profile information of a first user and user profile information of at least one second user, wherein the first user is a user of the terminal, and the second user is a peer user remote to the terminal;
determining first information based on the user profile information of the first user and the user profile information of the second user, wherein the first information comprises at least one of the following: personal information of the second user, or same feature information of the first user and the second user; and
displaying the first information on the first screen of the terminal.

2. The information obtaining method according to claim 1, wherein displaying the first information on the first screen of the terminal comprises:
displaying the first information on the first screen of the terminal in a text form or a graphic form.

3. The information obtaining method according to claim 1, wherein after displaying the first information on the first screen of the terminal, the information obtaining method further comprises:
when content of communication between the first user and the second user comprises field information in the first information, conspicuously displaying the field information.

4. The information obtaining method according to claim 3, wherein after the conspicuously displaying the field information, the information obtaining method further comprises:
receiving a first input by the first user to the field information; and
displaying second information on the first screen in response to the first input, wherein the second information is information that is associated with the field information and that is in the user profile information of the second user.

5. The information obtaining method according to claim 1, wherein at least one piece of communication information sent by the second user is displayed in the communication interface of the first user and the second user; and
the information obtaining method further comprises:
receiving a second input by the first user to the piece of communication information sent by the second user; and
displaying third information on the first screen in response to the second input, wherein the third information is information associated with content of the communication information.

6. A terminal, comprising at least two screens comprising a first screen and a second screen, a processor, a memory, and a computer program that is stored in the memory and that can be run on the processor, wherein when the computer program is executed by the processor, cause the processor to:
while a first user is in active communication with a second user through a communication interface displayed on the second screen, obtain user profile information of a first user and user profile information of at least one second user, wherein the first user is a user of the terminal, and the second user is a peer user remote to the terminal;
determine first information based on the user profile information of the first user and the user profile information of the second user obtained by the obtaining module, wherein the first information comprises at least one of the following: personal information of the second user, or same feature information of the first user and the second user; and
display, on the first screen of the terminal, the first information determined by the determining module.

7. The terminal according to claim 6, wherein the processor is further configured to:
display the first information on the first screen of the terminal in a text form or a graphic form.

8. The terminal according to claim 6, wherein the processor is further configured to:
after the first information is displayed on the first screen of the terminal, if content of communication between the first user and the second user comprises field information in the first information, highlight the field information.

9. The terminal according to claim 8, wherein the processor is further configured to:
after the field information is conspicuously displayed, receive a first input by the first user to the field information; and
display second information on the first screen in response to the first input received by the first receiving module, wherein the second information is information that is associated with the field information and that is in the user profile information of the second user.

10. The terminal according to claim 6, wherein at least one piece of communication information sent by the second user is displayed in a communication interface of the first user and the second user; and
the processor is further configured to:
receive a second input by the first user to the piece of communication information sent by the second user; and
display third information on the first screen in response to the second input received by the second receiving module, wherein the third information is information associated with content of the communication information.

11. A non-transitory computer-readable storage medium, wherein the computer-readable storage medium stores a computer program, and when the computer program is executed by a processor of a terminal comprising a first screen and a second screen, an information obtaining method is implemented, wherein the information obtaining method comprises:
while a first user is in active communication with a second user through a communication interface displayed on the second screen, obtaining user profile information of a first user and user profile information of at least one second user, wherein the first user is a user of the terminal, and the second user is a peer user remote to the terminal;
determining first information based on the user profile information of the first user and the user profile information of the second user, wherein the first information comprises at least one of the following: personal information of the second user, or same feature information of the first user and the second user; and
displaying the first information on the first screen of the terminal.

12. The non-transitory computer-readable storage medium according to claim 11, wherein displaying the first information on the first screen of the terminal comprises:
displaying the first information on the first screen of the terminal in a text form or a graphic form.

13. The non-transitory computer-readable storage medium according to claim 11, wherein after displaying the first information on the first screen of the terminal, the information obtaining method further comprises:
when content of communication between the first user and the second user comprises field information in the first information, conspicuously displaying the field information.

14. The non-transitory computer-readable storage medium according to claim 13, wherein after the conspicuously displaying the field information, the information obtaining method further comprises:
- receiving a first input by the first user to the field information; and
- displaying second information on the first screen in response to the first input, wherein the second information is information that is associated with the field information and that is in the user profile information of the second user.

15. The non-transitory computer-readable storage medium according to claim 11, wherein at least one piece of communication information sent by the second user is displayed in a communication interface of the first user and the second user; and
- the information obtaining method further comprises:
- receiving a second input by the first user to the piece of communication information sent by the second user; and
- displaying third information on the first screen in response to the second input, wherein the third information is information associated with content of the communication information.

* * * * *